US006957818B2

(12) United States Patent
McClure et al.

(10) Patent No.: US 6,957,818 B2
(45) Date of Patent: Oct. 25, 2005

(54) HAND STEERABLE SPORTS SCOOTER

(75) Inventors: Eric McClure, Trabuco Canyon, CA (US); Fredric I. Albert, Newport Beach, CA (US); Ivan M. Spiers, Laguna Beach, CA (US)

(73) Assignee: Sic LLC, Irvine, CA (US)

( * ) Notice: Subject to any disclaimer, the term of this patent is extended or adjusted under 35 U.S.C. 154(b) by 0 days.

(21) Appl. No.: 10/897,046

(22) Filed: Jul. 22, 2004

(65) Prior Publication Data

US 2005/0001393 A1 Jan. 6, 2005

Related U.S. Application Data

(63) Continuation of application No. 10/198,566, filed on Jul. 18, 2002, now Pat. No. 6,805,364, which is a continuation-in-part of application No. 09/912,919, filed on Jul. 25, 2001, now abandoned, which is a continuation-in-part of application No. 29/133,100, filed on Nov. 22, 2000, now Pat. No. Des. 451,162.
(60) Provisional application No. 60/355,710, filed on Feb. 7, 2002.

(51) Int. Cl.[7] .............................................. B62B 13/00
(52) U.S. Cl. ..................................... 280/14.28; 280/20
(58) Field of Search .......................... 280/14.28, 7.12, 280/14.25, 16, 20, 28, 87.041, 87.042, 205, 14.27, 14.1, 14.21, 14.22

(56) References Cited

U.S. PATENT DOCUMENTS

| 1,294,375 | A | * | 2/1919 | Austin ........................... 280/22 |
| 1,524,850 | A | * | 2/1925 | Van Daam ................ 280/14.28 |
| 1,681,297 | A | * | 8/1928 | Lindroos ..................... 280/22 |
| 1,745,643 | A | | 2/1930 | Roessel |
| 1,945,170 | A | | 1/1934 | Wetzel |
| 1,968,975 | A | | 8/1934 | Upsacker et al. |
| 2,101,229 | A | * | 12/1937 | Anderson et al. ........ 280/14.28 |

(Continued)

FOREIGN PATENT DOCUMENTS

| CH | 616 854 | 4/1980 |
| FR | 2 609 899 | 1/1987 |
| WO | PCT/US02/23187 | 7/2002 |

Primary Examiner—J. Allen Shriver
(74) Attorney, Agent, or Firm—Stetina Brunda Garred & Brucker

(57) ABSTRACT

A steerable sports scooter including a bi-laterally pivotable independent forward portion, a hand-operable direction controller, and an independent rearward portion in secured communication with the forward portion and having a support surface upon which to stand. Preferably, the forward portion of the scooter is angularly adjustable for selecting approach pitch, while the rearward portion includes a brake member. The brake member may be a manual brake member or a mechanical brake member. The scooter may be a snow scooter. The snow scooter may include a skag. The skag may be detachable and may be connected to the brake member. A preferable direction controller is a stem with a handle bar set for grasping and turning by hand. Most preferably, the stem is in axially pivotally attached communication with the forward portion for selectively moving the stem between a generally vertical and a generally horizontal orientation to thereby permit folding upon the snow scooter for easy carrying and transport. The steerable scooter so defined permits the user thereof to easily ride and maneuver over a snow surface for an enjoyable experience. The snow scooter may include a wheel component(s) or a tread positioned below the rearward portion to facilitate movement of the scooter through snow.

16 Claims, 11 Drawing Sheets

U.S. PATENT DOCUMENTS

| | | | |
|---|---|---|---|
| 2,256,203 A | | 9/1941 | Hylan |
| 2,316,272 A | | 4/1943 | Meyer |
| 2,359,076 A | * | 9/1944 | Asbury ........................ 280/16 |
| 2,513,199 A | | 6/1950 | Ohlhaver |
| 2,711,326 A | | 6/1955 | Sorensen |
| 2,950,924 A | | 8/1960 | Gantz |
| 3,438,643 A | | 4/1969 | Speihs |
| 3,870,330 A | * | 3/1975 | Hatano et al. ................ 280/16 |
| 4,037,852 A | * | 7/1977 | Bayer et al. ........... 280/87.042 |
| 4,073,356 A | | 2/1978 | Schlicht |
| 4,167,225 A | * | 9/1979 | Fragoso ........................ 188/5 |
| 4,221,394 A | | 9/1980 | Campbell |
| 4,274,647 A | * | 6/1981 | Drake, Jr. ............. 280/87.042 |
| 4,708,353 A | | 11/1987 | Evequoz |
| 4,984,648 A | * | 1/1991 | Strzok ........................ 180/181 |
| 5,090,716 A | * | 2/1992 | Borden .................. 280/87.042 |
| 5,305,846 A | * | 4/1994 | Martin ....................... 180/181 |
| 5,351,975 A | | 10/1994 | Petod |
| 5,470,089 A | * | 11/1995 | Whitson et al. ........ 280/87.041 |
| 5,516,126 A | * | 5/1996 | Myers ..................... 280/14.28 |
| 6,137,923 A | * | 10/2000 | Takeo et al. ................. 382/308 |
| 6,139,031 A | * | 10/2000 | Wingard .................. 280/14.28 |
| 6,186,524 B1 | | 2/2001 | McQueeny et al. |
| D451,162 S | | 11/2001 | Spiers |
| 6,317,923 B1 | | 11/2001 | Lo |
| 6,345,678 B1 | * | 2/2002 | Chang ........................ 180/181 |
| 6,474,660 B1 | * | 11/2002 | Warren ..................... 280/7.12 |
| D467,199 S | | 12/2002 | McClure et al. |
| 2002/0096846 A1 | * | 7/2002 | Chen ..................... 280/87.041 |
| 2002/0109314 A1 | * | 8/2002 | Chen ....................... 280/14.28 |
| 2002/0121757 A1 | * | 9/2002 | Louh .................... 280/87.041 |
| 2002/0180168 A1 | * | 12/2002 | Rizk .................... 280/87.041 |
| 2003/0141682 A1 | * | 7/2003 | Comden .................. 280/14.28 |

* cited by examiner

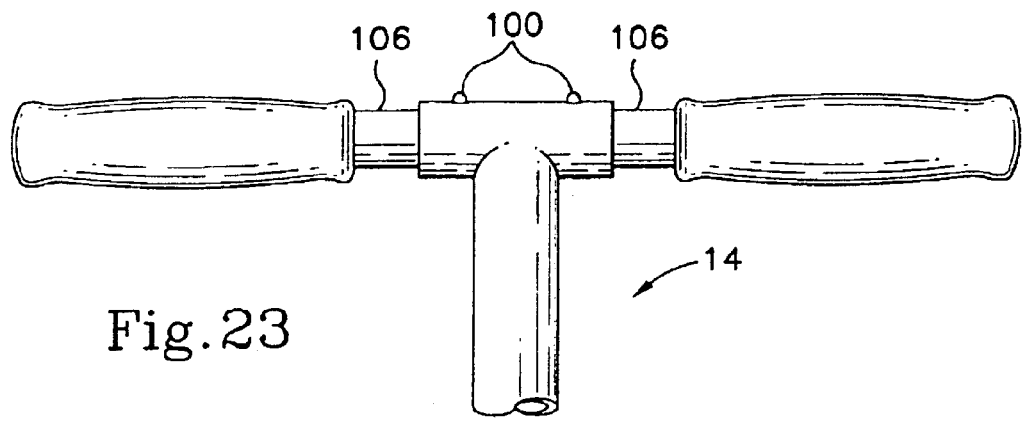
Fig.23
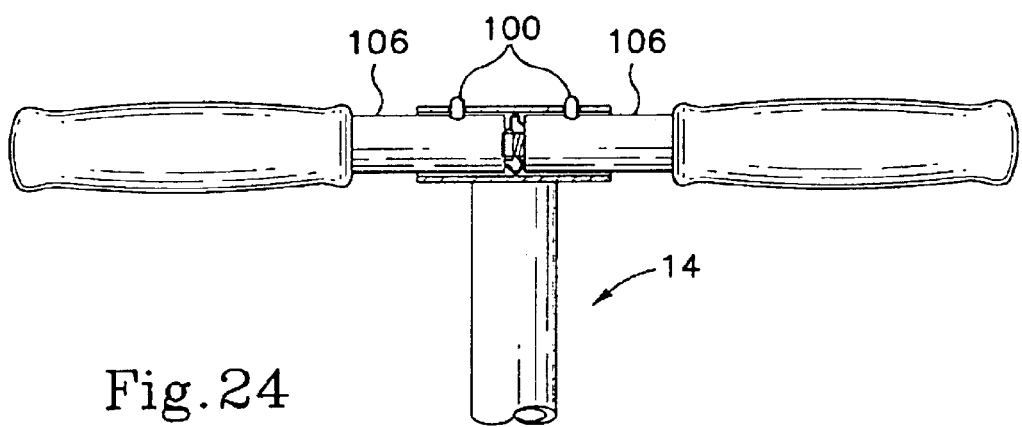
Fig.24
Fig.25
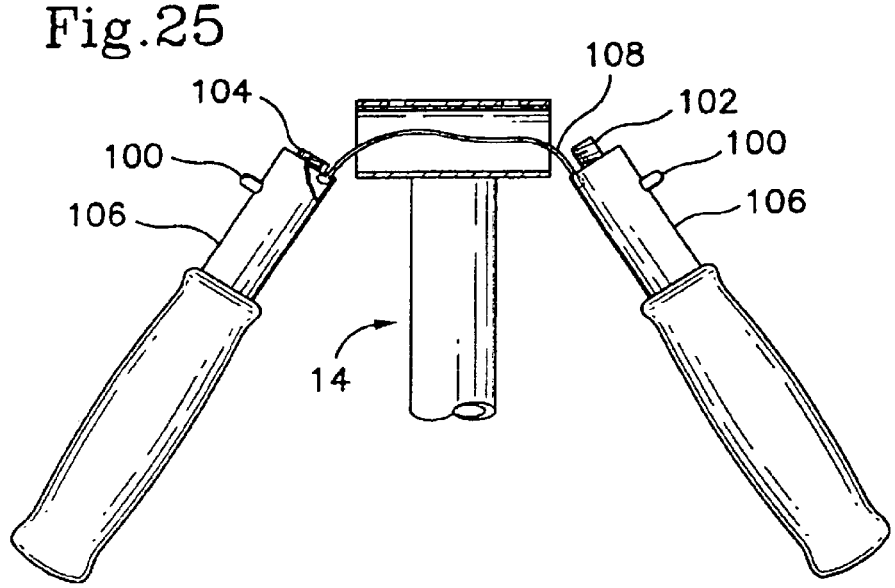

HAND STEERABLE SPORTS SCOOTER

CROSS-REFERENCE TO RELATED APPLICATIONS

This application is a continuation of U.S. application Ser. No. 10/198,566, filed Jul. 18, 2002, now U.S. Pat. No. 6,805,364, which claims the benefit of U.S. Provisional Application 60/355,710, filed Feb. 7, 2002, the entire contents of which are hereby incorporated by reference and is a continuation-in-part of U.S. patent application Ser. No. 09/912,919, filed Jul. 25, 2001, now abandoned, the entire contents of which are hereby incorporated by reference, which is a continuation-in-part of U.S. patent application Ser. No. 29/133,100, filed Nov. 22, 2000, now U.S. Pat. No. D451,162.

STATEMENT RE: FEDERALLY SPONSORED RESEARCH/DEVELOPMENT (Not Applicable)

BACKGROUND OF THE INVENTION

The present invention is related in general to indoor/outdoor sports equipment, and in particular to a hand steerable scooter having an independent forward portion that is pivotable by choice of a user for steering the scooter as the user stands on the rear portion and travels over a surface. For example, the scooter may be a snow scooter that travels over a groomed and/or non-groomed snow path.

Participation in winter sports is a favorite pastime for many people as they experience downhill and cross-country skiing, ice-skating, playing hockey, ice fishing, and other activities. One such activity that continues to gain significant popularity is snowboarding. Specifically, snowboarding usually occurs on groomed ski slopes where skiers and snowboarders compete for downhill space. A present typical snowboard is constructed as a generally flat, relatively light-weight and smooth polymer board with at least one pocket structure mounted on the top of the board for accommodating the front portion of a booted foot of a user. In operation, the user positions the snowboard at the top of a ski trail, stands on the top of the snowboard with the front portion of one foot in the pocket structure, and thereafter propels and travels down the trail while balancing on the snowboard.

As is apparent from the above description of a usual snowboard, the user thereof must steer the snowboard by shifting body weight and without ski poles or the like as the snowboard travels, many times at high speed, down the ski trail. This situation can be, or become, very difficult for the user to maintain since the user may not have the expertise and/or the ability to favorably enjoy a downhill ride. In view of this snowboard expertise requirement, it is a primary object of the present invention to provide a snow scooter that is hand steerable by the onboard user and more user friendly as an enjoyable sport rider.

Another object of the present invention is to provide a hand steerable snow scooter that preferably has integral therewith a user-operable brake member. The brake member may be a manual brake member or a mechanical brake member.

Yet another object of the present invention is to provide a hand steerable snow scooter whose steerability preferably is accomplished with a handlebar type of direction controller.

Yet another object of the present invention is to provide a powered (e.g., battery-powered) hand steerable snow scooter.

These and other objects of the present invention will become apparent throughout the description thereof which now follows.

BRIEF SUMMARY OF THE INVENTION

The present invention is a steerable sports scooter including a bi-laterally pivotable independent forward portion, a hand-operable direction controller in communication with the forward portion, and an independent rearward portion, said rearward portion in secured communication with the forward portion and having a support surface upon which to stand.

Preferably, the forward portion of the scooter is angularly adjustable upwardly and downwardly in relation to a horizontal plane for selecting approach pitch, while the rearward portion includes a brake member for stopping the scooter during travel, for example for stopping the scooter on groomed and/or non-groomed snow, or even travel on a non-snow surface such as upon sand.

A preferable direction controller is a stem with a first end thereof attached to the forward portion and a second end thereof bearing a handle bar set for grasping and turning by hand. Most preferably, the first end of the stem is in axially pivotally attached communication with the forward portion for selectively moving the stem between a generally vertical orientation and a generally horizontal orientation to thereby permit folding the stem for easy carrying and transport.

The handle bars preferably include a spring biased latch mechanism that allows the handles to be collapsed for travel and storage but which lock into place to prevent inadvertent collapse of the handles during use.

Preferably, the steerable scooter is a steerable snow scooter. The steerable scooter so defined permits the user thereof to more easily enjoy over-snow travel and thereby greatly enhance the sporting experience.

Preferably, the rearward portion of the snow scooter has a grooved bottom.

The snow scooter may have one or more wheel components that facilitate movement. Such wheel components may be motorized. Preferably, the wheel components are retractable.

The snow scooter may have a tread to facilitate movement.

The brake member may be a manual brake member or a mechanical brake member. The snow scooter may include a skag. The skag may be detachable and may be connected to the brake member.

Other embodiments of the sports scooter may include wheels attached to the bottom of the scooter for use on surfaces such as concrete or pavement.

BRIEF DESCRIPTION OF THE DRAWINGS

An illustrative and presently preferred embodiment of the invention is shown in the accompanying drawings in which:

FIGS. 23–25 illustrate handlebars of a steerable sports scooter having a latch mechanism.

DETAILED DESCRIPTION OF THE INVENTION

Figure 1:
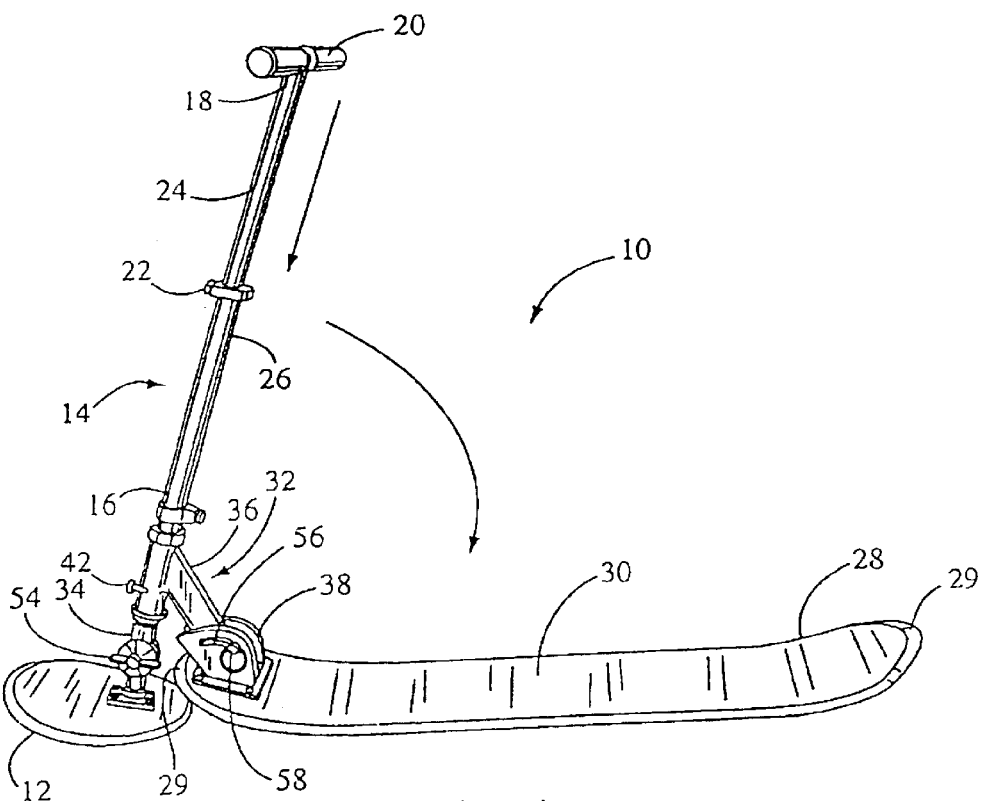
FIG. 1 is a perspective view of a steerable snow scooter in operational configuration.

A steerable sports scooter is shown and described herein. Exemplary embodiments of the steerable sports scooter include a steerable snow scooter and a steerable rollable scooter.

Referring to FIGS. 1–25, a hand steerable snow scooter 10 is illustrated. The snow scooter 10 has a bi-laterally pivotable independent forward portion 12 for traveling over snow, and a hand-operable direction controller preferably in the form of a telescopically length-adjustable stem 14 with a first end 16 thereof in attached communication with the forward portion 12 of the snow scooter 10 and a second end 18 thereof bearing a handle bar set 20 for grasping. Such telescopic length adjustability of the stem 14 is accomplished with a standard hand-operable setscrew device 22 whereby the top section 24 of the stem 14 can travel within the lower section 26 of the stem 14 when the setscrew device 22 is loosened and retained in a selected telescopic position upon tightening of the setscrew device 22. Finally, the snow scooter 10 includes a rearward portion 28 that has a support surface 30 upon which to stand. The rearward portion 28 is secured to the forward portion 12 with a connector joint 32.

In general, the rearward portion 28 is similar to prior art snowboards. The shape and material used for the rearward portion can be the same as any known prior art snowboards. As snowboard technology evolves in the future, new technologies (e.g., modified shapes or materials), the rearward portion 28 of the present invention can be adapted to accommodate new technologies of snowboards. Prior art snowboards may have an edge made out of a material, e.g., metal, which aids in the use of the snowboard. For example, many snowboards have sharp metal edges around the center of the snowboard and dull edges around the front and back of the snowboard. This edging helps the rider control the snowboard as desired. The sharp edges toward the center of the snowboard allow the rider to cut into the snow. Various embodiments of the present invention may have a rearward portion 28 that includes metal edges such as those typically found on many prior art snowboards.

Figure 7:
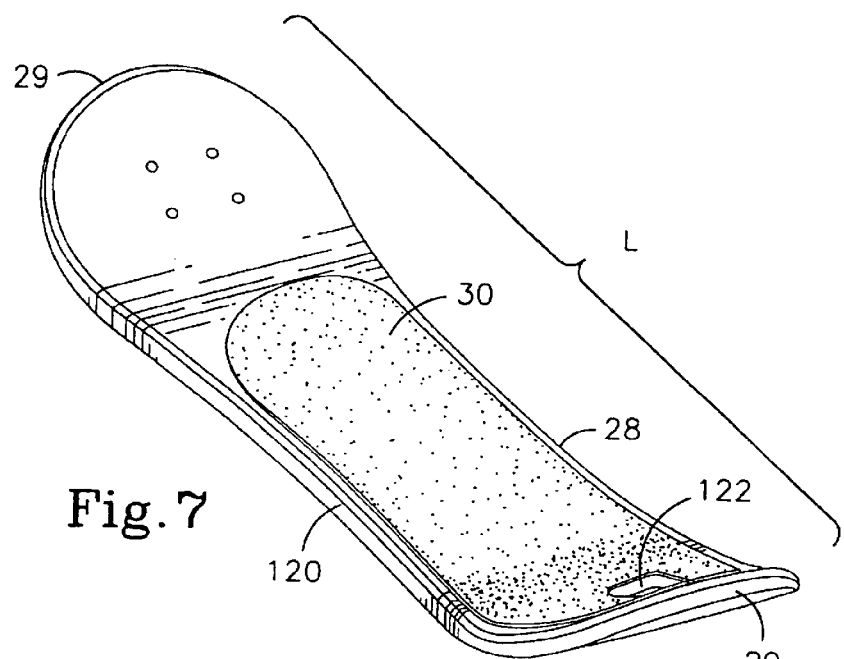
FIG. 7 is a perspective view of the rearward portion of the snow scooter of FIG. 1.
Figure 17:
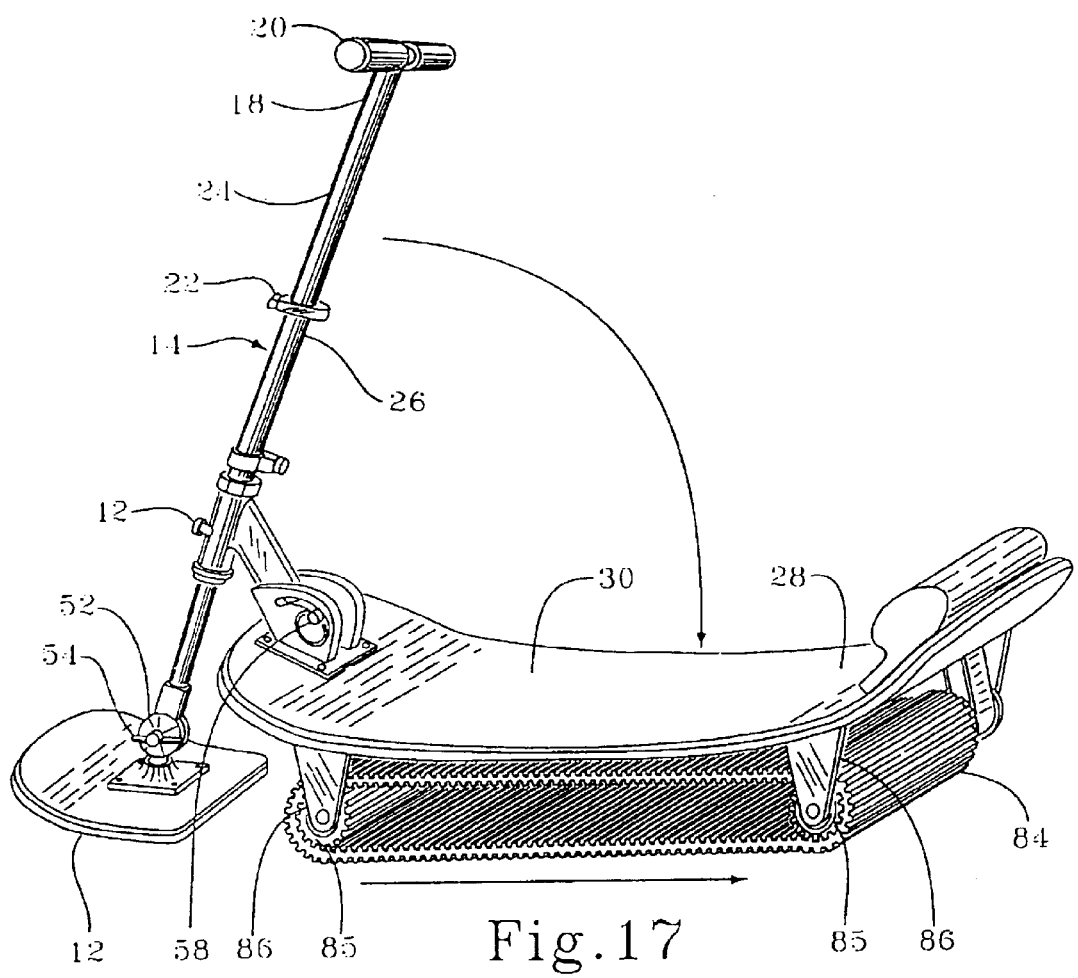
FIG. 17 is a perspective view of an embodiment of the present invention having a mechanical tread below the bottom of the rearward portion of the scooter.

Preferably, the rearward portion 28 and forward portion 12 each have a thickness t of about ½ inch. Preferably, the top sides of the rearward portion 28 and forward portion 12 are chamfered as shown in FIG. 7 such that the bottom of the sides edges 120 are substantially perpendicular (i.e., form a 90° angle) from the bottom surface 62. The side edges 120 angle in at about a 45° angle approximately half-way up the side edge 120. If the thickness t is ½ inch, there is about ¼ inch of the side edge at 90° from the bottom surface and about ¼ inch at a 45° angle. As shown in the figures, the forward portion 12 preferably has a curved front edge. The back edge of the forward portion 12 may be curved as shown in FIG. 1 or substantially flat as shown in FIG. 17.

Figure 8:
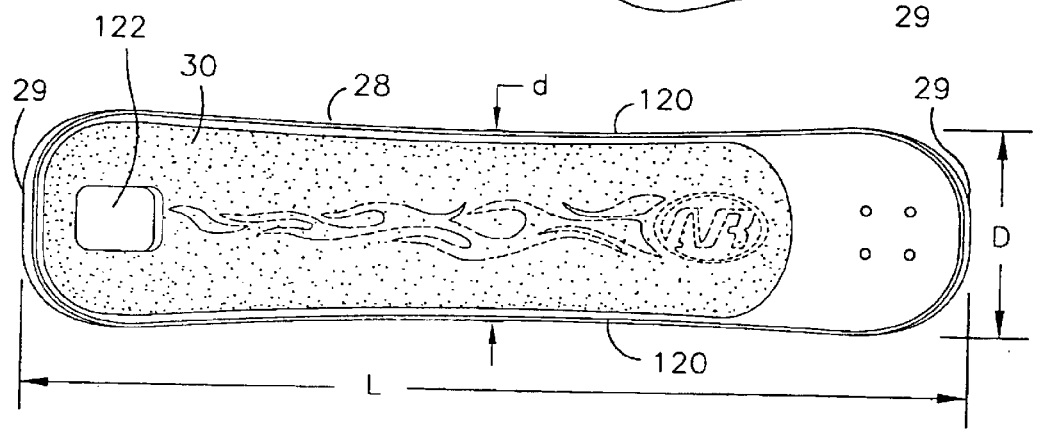
FIG. 8 is a perspective view of the rearward portion of the snow scooter of FIG. 1 on its side.
Figure 9:
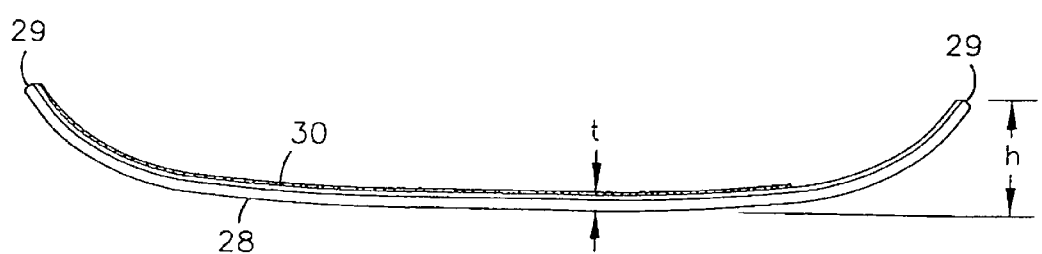
FIG. 9 is a side perspective view of the rearward portion of the snow scooter shown in FIG. 1.

The length of the rearward portion 28 preferably is greater than the length of the forward portion 12. In exemplary embodiments, the length L of the rearward portion 28 is three times the length of the forward portion 12. As best seen in FIGS. 7 and 8, in exemplary embodiments, the rearward portion has a length L of about 36 inches. In exemplary embodiments, the rearward portion 28 has a width at the center d (i.e., about 18 inches from either end) of about 8¼ inches that widens slightly to a width near the ends d of approximately 9 inches. In exemplary embodiments, the width of the forward portion 12 is about the same as the width of the rearward portion 28. Preferably, the two ends 29 of the rearward portion 28 curve upward as shown in FIG. 9 so that the ends 29 of the rearward portion 28 are raised. In exemplary embodiments, the raised height h is approximately 3½ inches above the middle section of the rearward portion 28.

Figure 2:
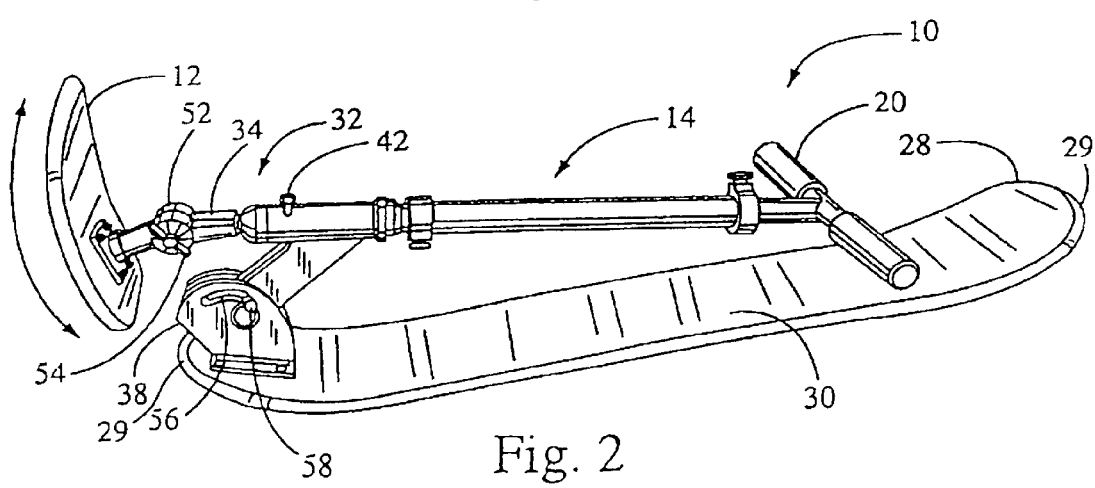
FIG. 2 is a perspective view of the snow scooter of FIG. 1 in collapsed configuration.
Figure 3:
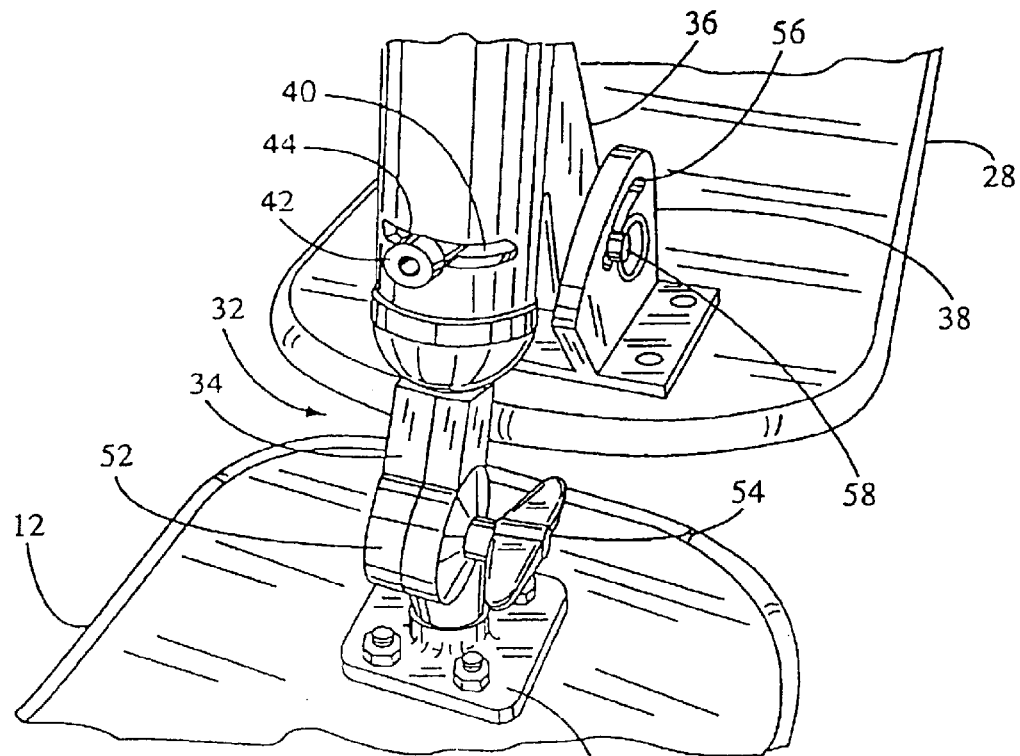
FIG. 3 is a perspective view of one lateral side of adjacent forward and rearward portions of the snow scooter of FIG. 1.
Figure 4:
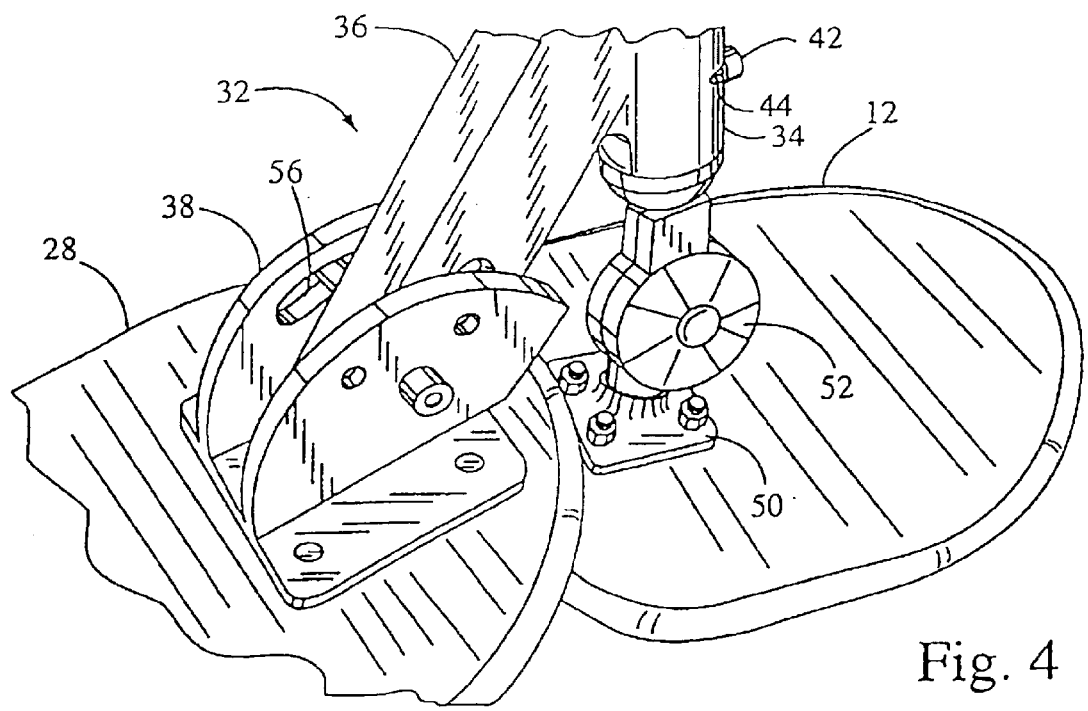
FIG. 4 is a perspective view of the lateral side opposite that shown in FIG. 3.
Figure 5:
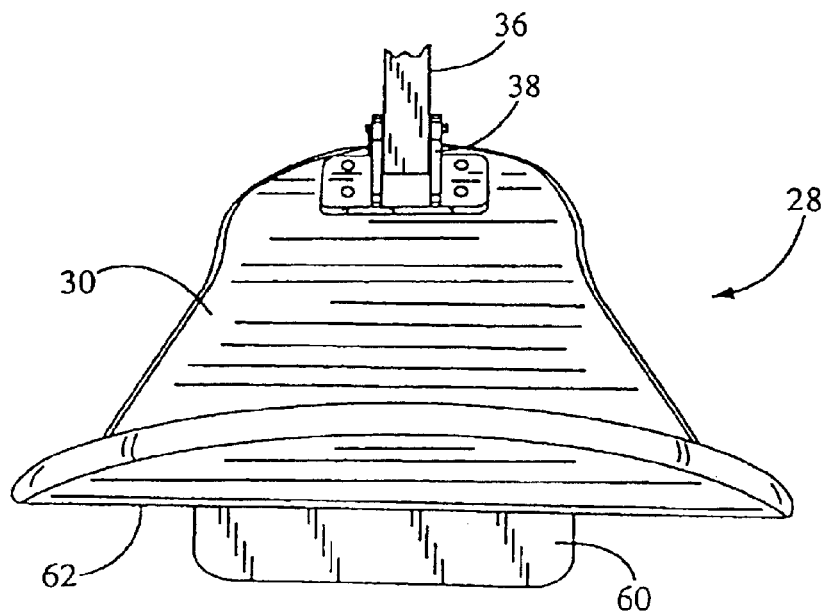
FIG. 5 is a rear perspective view of the rearward portion of the snow scooter of FIG. 1.

As shown clearly in FIGS. 1–4, the connector joint 32 has a first element 34 in attached communication to the forward portion 12 through a base 50 and a second element 36 connected to a slotted pivotal joint 38 attached to the rearward portion 28. A stalk 40 extends from a base 50 into the first element 34 and is secured therein with a pin 42. A stop member, preferably constructed as a limited-length slot 44 within which the pin 42 passes, functions to limit bi-lateral pivotal movement of the forward portion 12. The base 50 preferably includes a standard ratchet assembly (not shown) within a housing 52 and with an externally accessible set lever 54 whereby the forward portion 12 is movable either to a folded position or, as would be recognized by a skilled artisan, angularly adjustable upwardly and downwardly in relation to a horizontal plane to thereby select as desired a forward pitch of the forward portion 12. Finally, as shown in FIG. 2, the pivotal joint 38 accommodates the second element 36 of the connector joint 32 and is provided with an arcuate slot 56 within which a setscrew pin 58 projecting from the second element 36 rides for selectively folding the stem 14 between a generally vertical orientation (FIG. 1) and a generally horizontal orientation (FIG. 2) and thereafter releasably securing the chosen orientation.

Figure 6:
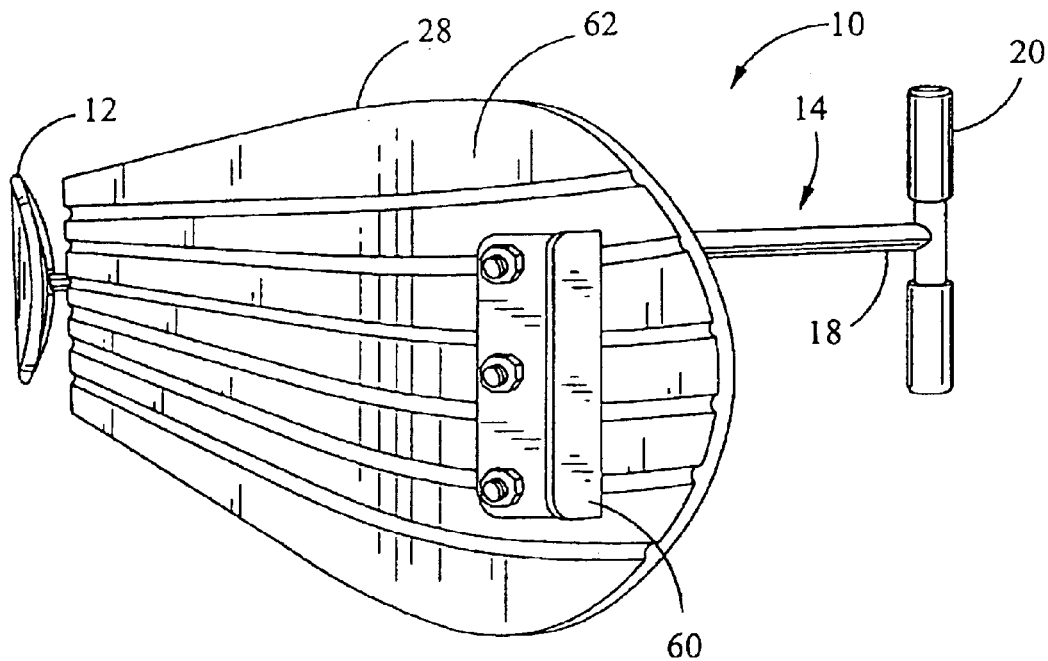
FIG. 6 is a rear perspective view of the snow scooter of FIG. 1 on its side.
Figure 10:
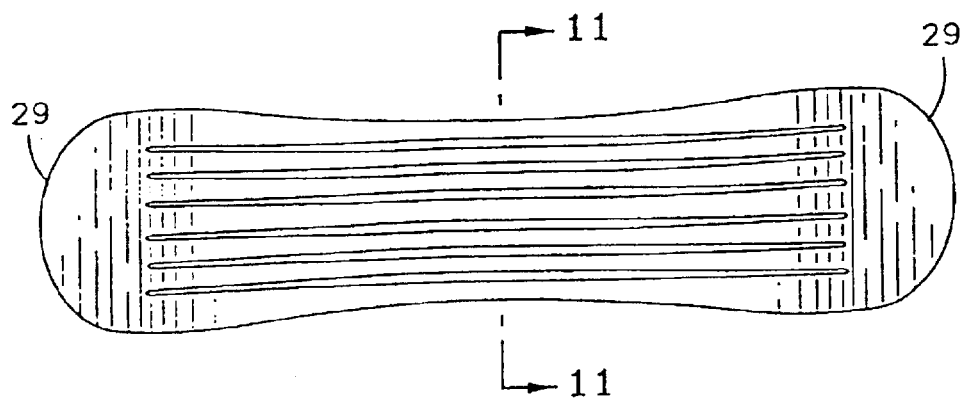
FIG. 10 is a perspective view of the bottom of the rearward portion of the snow scooter of FIG. 1.
Figure 11:
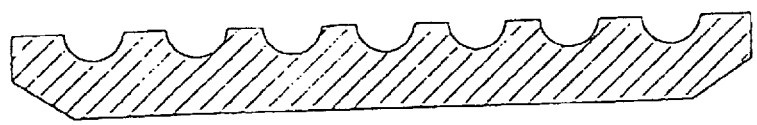
FIG. 11 is a cross sectional view of the bottom of the rearward portion of the snow scooter shown in FIG. 10.

As shown in FIGS. 6, 10 and 11, the bottom surface 62 of the rearward portion 28 is preferably grooved. In exemplary embodiments, each of the grooves are about 14 mm wide and about 3/8 inch deep. Preferably, each groove is spaced about 12 mm away from the next groove and the first and last grooves are located about 24 mm from the outer edges of the bottom surface 62 of the rearward portion 28. Preferably, the grooves extend the entire flat portion of the bottom surface 62, ending at the point where the rearward portion 28 curves upwardly. The grooved surface aids in proper tracking of the snow scooter 10 and helps the rider of the snow scooter 10 in maneuvering, e.g., turning the snow scooter 10. The forward portion 12 may also include a grooved surface.

As shown in FIGS. 7–10, exemplary embodiments of the present invention may include an increased traction surface on support surface 30. The traction surface may stop at the portion of the rearward portion 28 that curves upward or the increased traction surface may extend up onto the curved portion at the front and/or back of the rearward portion 28. The traction surface may be plain as shown in FIG. 7 or may include a design and/or logo as shown in FIG. 8. The increased traction surface may be a second surface that is affixed to the rearward portion 28 as shown in the figures. The increased traction surface may be manufactured from a variety of materials, such as pliant foam, foam rubber or hard rubber.

The preferred snow scooter 10 additionally includes a brake member most preferably in the form of a plate 60 extending downwardly from an aft site of the bottom surface 62 of the rearward portion 28 for travel within snow and stopping the snow scooter 10 by creating resistance within the snow when downward pressure is applied on the support surface 30 above the plate 60.

Figure 12:
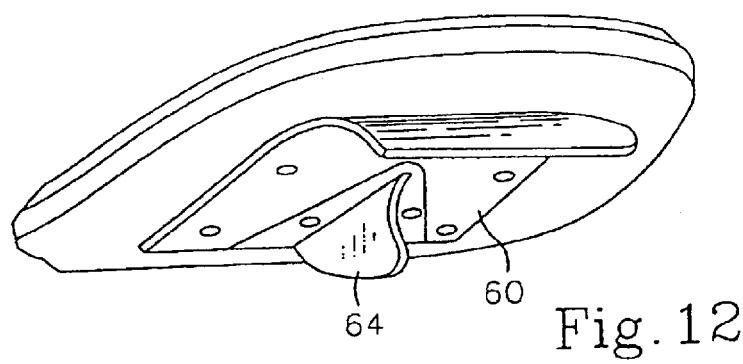
FIG. 12 is a perspective view of the aft area of the bottom of the rearward portion of a snow scooter as shown in FIG. 1 including a brake plate and a skag.
Figure 13:
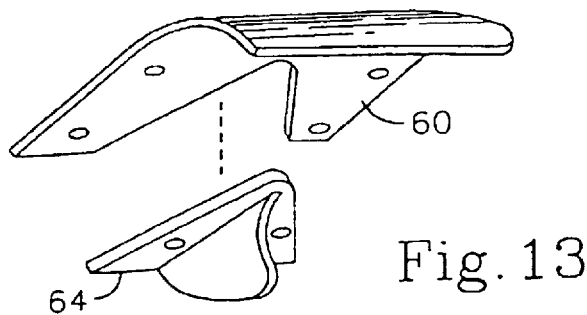
FIG. 13 is a perspective view of the brake plate and skag shown in FIG. 12 with the skag detached from the brake plate.

Preferably, the snow scooter 10 also includes a skag 64 to aid in stability of the snow scooter. The skag 64 is preferably attached to the brake plate 60. FIG. 12 shows a detachable skag 64 attached to the brake plate 60. FIG. 13 shows the skag 64 of FIG. 12 detached from the brake plate 60. The skag 64 may be attached to and detached from the brake plate 60 with one or more fastening devices, such as screws.

The brake may be employed in a manual fashion with the rider applying downward pressure on the support surface 30 above the brake plate 60. For example, the brake plate shown in FIGS. 12 and 13 includes a flat surface portion (that attaches to the bottom of the rearward portion of the snow scooter) and a downward curving portion. The downward curving portion pushes into the snow when downward pressure is applied over the brake plate.

Figure 14:
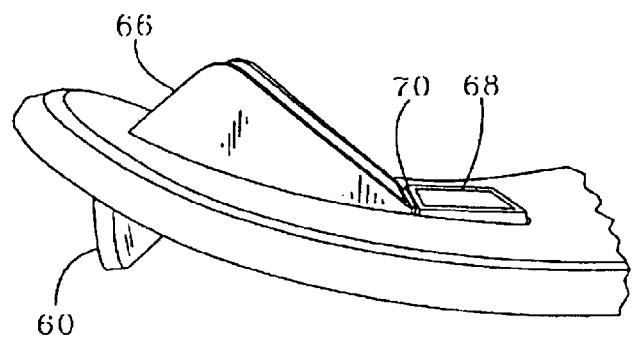
FIG. 14 is a side perspective view of the aft area of the rearward portion of a snow scooter as shown in FIG. 1 including a mechanical brake.
Figure 15:
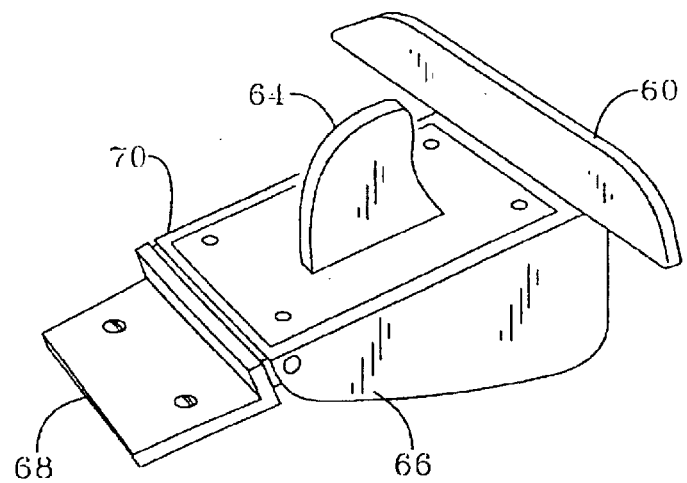
FIG. 15 is a perspective view of the bottom of the mechanical brake (including a skag) shown in FIG. 14.
Figure 16:
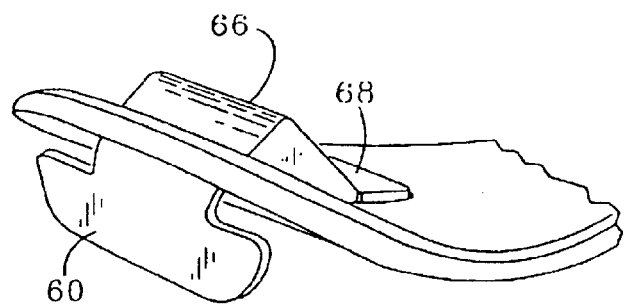
FIG. 16 is a perspective view of the mechanical brake shown in FIG. 14.

In other embodiments, the brake member 60 may be a mechanical brake member 60, such as the one shown in FIGS. 14–16. For such embodiments, the rearward portion may include a brake aperture 122 formed therethrough located adjacent to the rear end 29 and positioned midway between the side edges 120. The brake aperture 122 may be generally rectangularly shaped as shown in FIGS. 7 and 8. The mechanical brake member 60 includes a brake pedal 66 connected to the brake plate 60. The brake pedal 66 and brake plate 60 are preferably sized complementary to the brake aperture 122 and are configured to be rotated therethrough. Brake pedal 66 is attached to the upper surface 30 of the rearward portion 28 via attachment means 70, such as springs, that are attached to attachment plate 68. The rider normally keeps the front portion of his foot (his toes) on attachment plate 68. When the rider wishes to activate the brake member 60, the rider simply moves his foot downwardly onto brake pedal 66. Overcoming the upwardly biasing force of the springs 70 causes the brake pedal 66 and the attached brake plate 60 to rotate in a downward direction through the brake aperture 122 such that the brake plate 60 is pushed into the snow. The brake pedal 66 and brake plate 60 are configured to be rotated through the brake aperture when pressed downwardly such that the brake plate 60 is moved into contact with the surface of the snow when a rider exerts downward pressure on the brake pedal 66. It will be appreciated that the brake pedal 66 and brake plate 60 as well as the brake aperture 122 may vary in shape and size in various embodiments of the invention.

Operation of the snow scooter 10 generally begins as a user orients the stem 14 in a generally vertical configuration and chooses a desired pitch of the forward portion 12. The user then steps aboard the support surface 30 of the rearward portion 28 and begins travel down a ski trail run. During this travel, the user can determine the direction of the snow scooter 10 by turning the handlebar set 20 which, of course, laterally directs the forward portion 14 and aims the snow scooter 10. Full speed travel is generally achieved by maintaining foot contact at about the forward two-thirds of the top surface 30 such that pressure is not applied over the top of the brake plate 60. Conversely, when slowing or stopping the snow scooter 10 is desired, the user places a foot on the top surface 30 at a site above the brake plate 60 and applies downward pressure, thereby forcing the plate 60 into the snow to create resistance and decrease velocity. In this manner, the user is able to enjoy a snowboarding-type sport while simultaneously having an easy-to-ride snow scooter for enjoyment in navigating a ski-trail run.

In exemplary embodiments the handle bars 106 are collapsible as shown in FIGS. 23–25. In the embodiment shown in FIGS. 23–25, a spring bias latch mechanism, such as a detent, is used to secure the handle bars 106 in the operational configuration shown in FIG. 23. If the user wishes to collapse the handlebars 106 to the position shown in FIG. 25, the user presses a latch button 100 in order to unlatch and release the handlebars 106. To prevent inadvertent collapsing of the handlebars 106, preferred embodiments, such as the one shown, include a security latching feature. For example, in the embodiment shown, one handlebar end 106 includes a threaded end 102 and the other handle bar end 106 includes a receiving means 104 configured to receive the threaded end 102. Exemplary embodiments also include a connecting device 108, such as rope or tubing to prevent the handle bars 106 from becoming completely disengaged from the stem 14 of the direction controller when the handle bars are in the collapsed configuration shown in FIG. 25.

Figure 18:
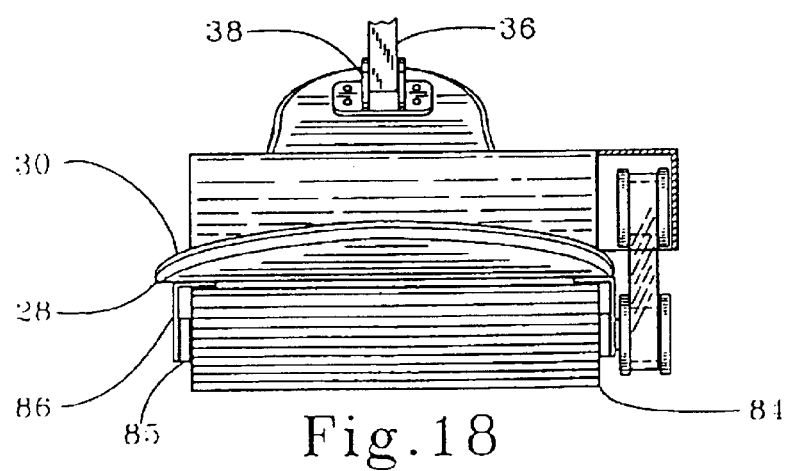
FIG. 18 is a rear perspective view of the snow scooter having a mechanical tread as shown in FIG. 17.
Figure 19:
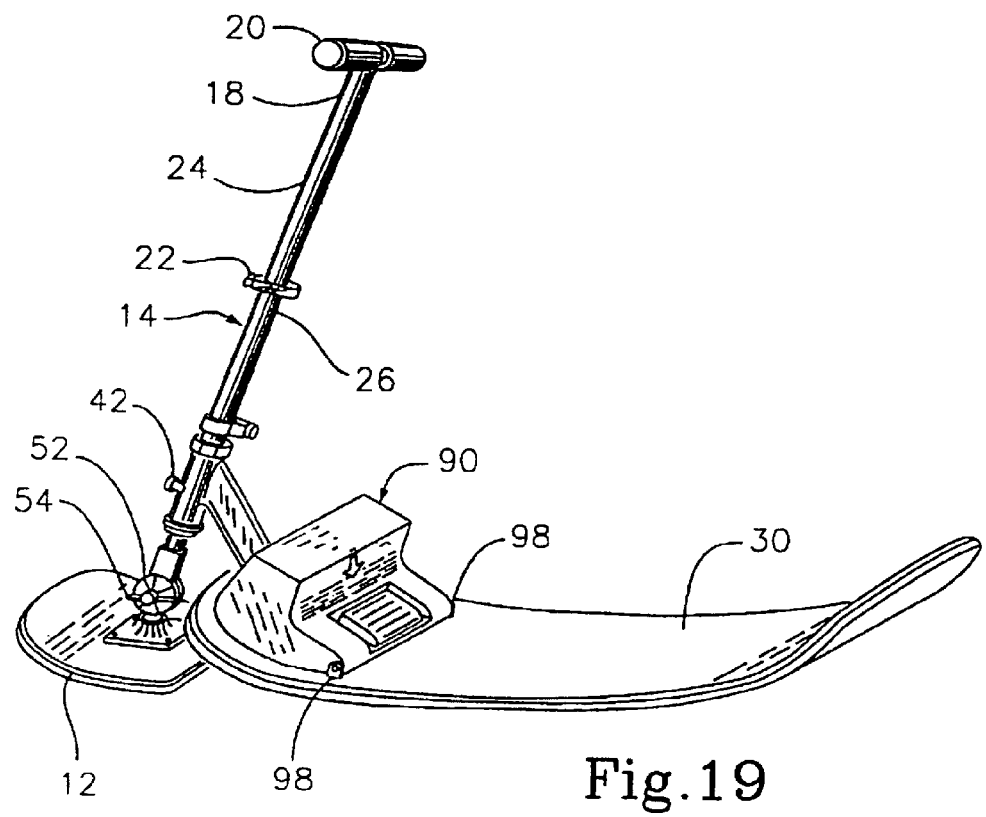
FIG. 19 is a perspective view of an embodiment of a battery powered snow scooter.

FIGS. 17–18 illustrate an embodiment of the snow scooter 10 which includes a tread 84 mounted to the underside of the rearward portion 28 of the snow scooter. In the embodiment shown, there are two rollers 85 attached to the rearward portion 28 of the snow scooter via brackets 86. The tread 84 allows the rider to use the scooter in difficult terrain, for example, on flat or uphill surfaces.

FIGS. 19–22 illustrate another embodiment of the snow scooter 10 which is battery powered. Such an embodiment combines the benefits of the embodiments shown in FIGS. 1–16 with those of the embodiment shown in FIGS. 17–18.

Figure 20:
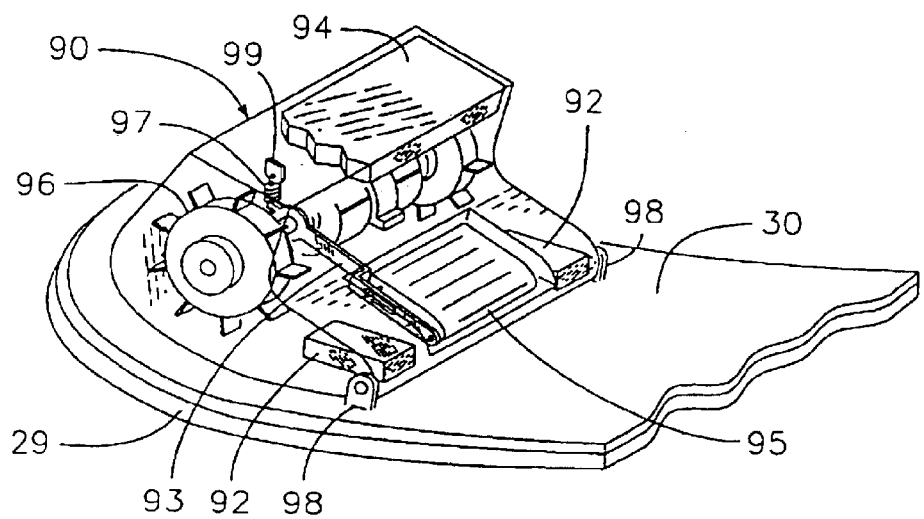
FIG. 20 is a top perspective view of the motor of the battery powered snow scooter shown in FIG. 19.
Figure 21:
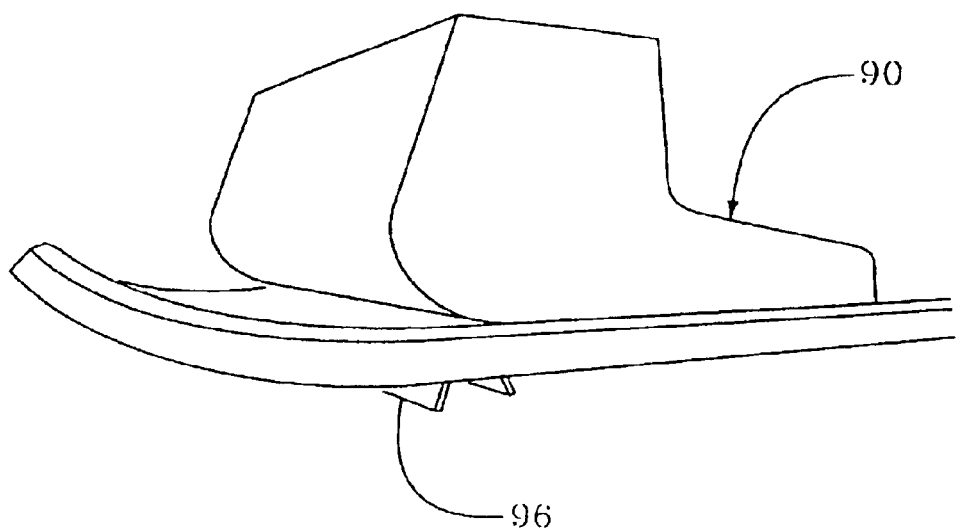
FIG. 21 is a side perspective view of the battery powered snow scooter shown in FIG. 19 with the wheels in a deployed-position.
Figure 22:
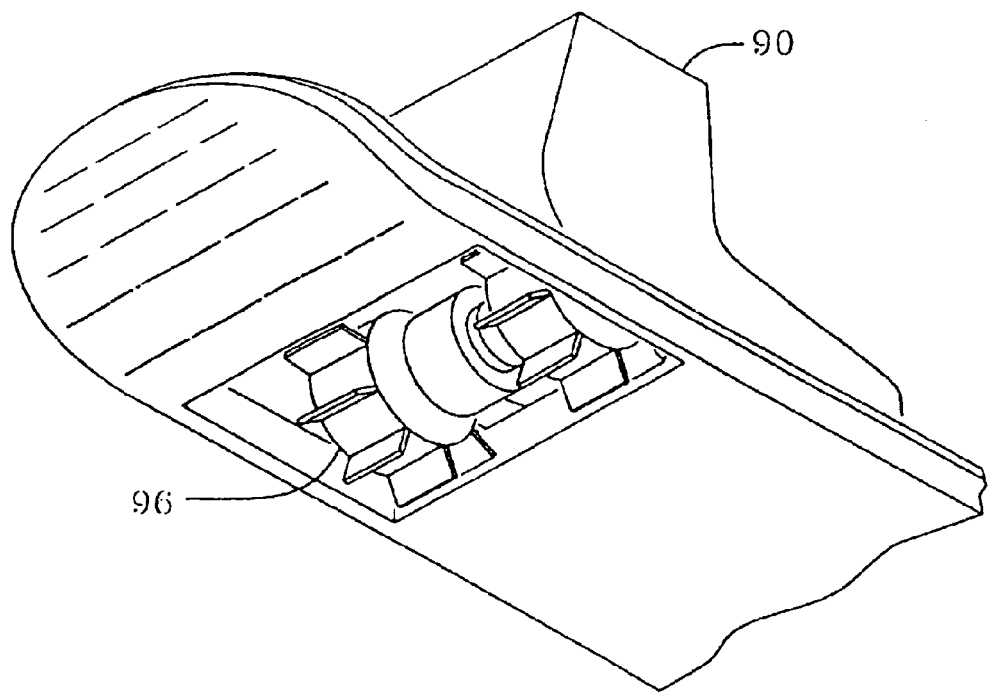
FIG. 22 is a bottom perspective view of the motor component of the battery powered snow scooter shown in FIG. 19.

The embodiment shown in FIGS. 19–22 allows the rider to use the battery power, if desired, to help propel the snow scooter 10 through difficult terrain. A motor 94 is located in a housing 90. In the embodiment illustrated, batteries 92 supply power to the motor 94 which rotates wheels 96. The wheels 96 in the illustrated embodiment resemble a paddle wheel. It will be appreciated that other wheel 96 designs, such as a deep treaded wheel may be used. In its normal configuration, the wheels 96 are in the housing 90 which is located on the support surface 30 towards the front of the rearward portion 28. Thus, the wheels 96 are not touching the snow and the snow scooter's 10 operation is the same as if there were no wheels 96. However, if the user wanted to use the wheels 96, he simply presses a foot pedal 95 to lower the wheels 96 into the snow via a pivoting lever 93 upwardly biasing the wheels 96 by a spring 97 affixed to the housing 90 by a clip 99, as is shown in FIG. 20. Like the treaded snow scooter 10 shown in FIGS. 17–28, the wheels 96 aid the user in traversing difficult terrain. While the embodiment shown includes one set of motorized wheels 96 in the front of the rearward portion 28 of the snow scooter 10, it will be appreciated that other configurations are possible. For example, there may be another set of motorized wheels 96 disposed toward the back end 29 of the rearward portion 28 of the snow scooter 10.

Figure 26:
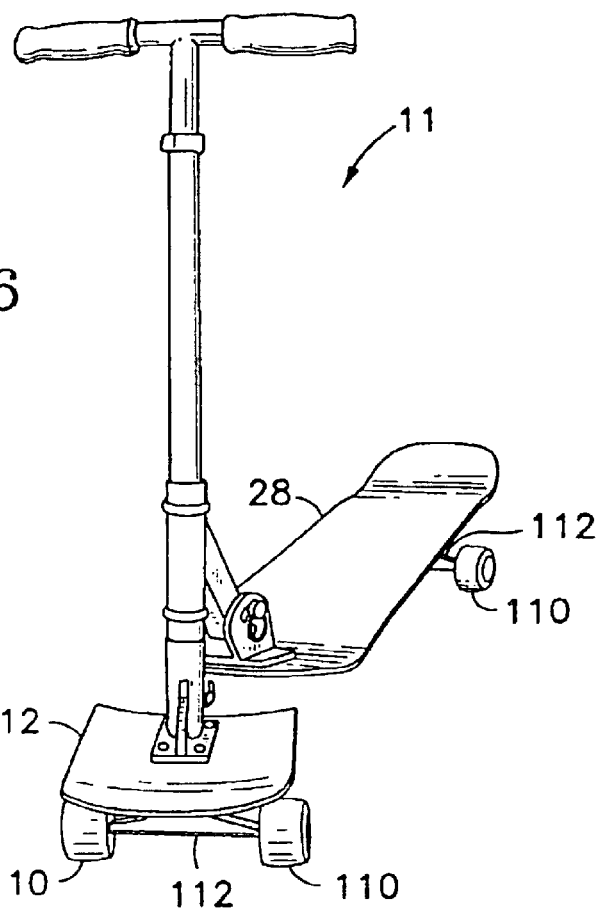
FIGS. 26–27 are perspective views of a scooter with wheels.
Figure 27:
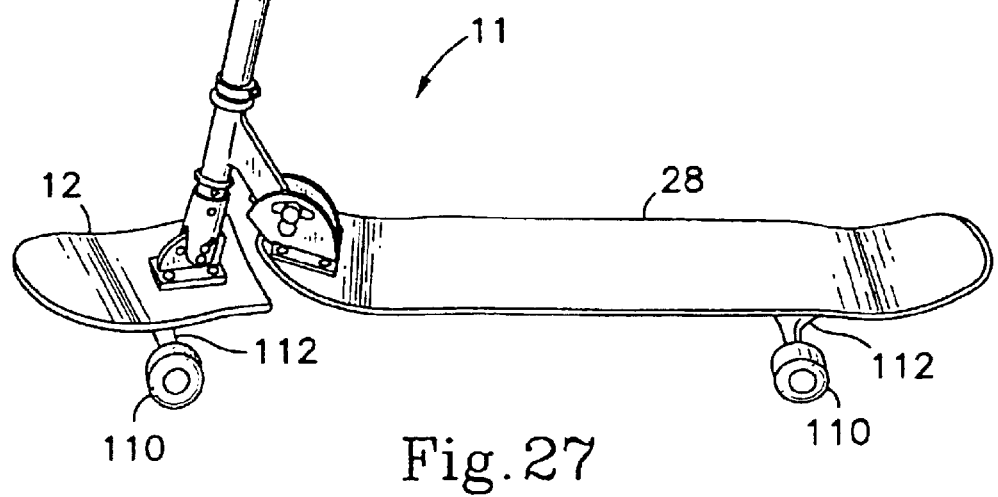

FIGS. 26–27 illustrate a rollable embodiment 11 of the steerable sports scooter. The rollable embodiment 11 is similar to the steerable snow scooter 10 described above and additionally includes wheels 110 for traveling over solid surfaces such as concrete or pavement. In the preferred embodiments shown, the steerable rollable scooter includes two wheels 110 attached to the bottom surface of the forward portion 12 and two wheels attached to the bottom surface of the rearward portion 28. It will be appreciated that other embodiments may have he wheels in a different location such as more towards the center of the rearward portion 28. Other embodiments may include a different number of wheels, e.g., an additional set of wheels on the rearward portion or, one ore more centered wheels, like roller blades.

The wheels 110 are attached to the forward portion 12 and the rearward portion 28 using trucks 112. The trucks 112 are known in the art and are used, for example, for attaching wheels to skateboards. The trucks 112 aid in the maneuverability of the scooter 11.

Preferably, the wheelable scooter 11 also includes a brake (not shown) to aid in the stopping of the scooter 11.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A steerable snow scooter comprising:
    a) a bi-laterally pivotable independent forward portion for traveling over snow;
    b) a hand-operable direction controller in communication with the forward portion;
    c) an independent rearward portion having a top surface and a bottom surface and a front end and a rear end and defining a pair of opposing side edges, the independent rearward portion for traveling over snow, the rearward portion including a brake aperture formed therethrough and being located adjacent to the rear end and positioned midway between the side edges, said rearward portion in secured communication with the forward portion and having a support surface upon which to stand; and
    d) a brake member positioned near the rear end of the rearward portion, the brake member being configured as a mechanical brake member comprising a brake pedal connected to a brake plate unitary of construction having a flat surface portion and a downwardly curved portion extending therefrom, the brake pedal and brake plate being sized complementary to the brake aperture and being configured to be rotated therethrough when pressed downwardly such that the brake plate is moved into contact with the surface of the snow.

2. The steerable snow scooter as claimed in claim 1 wherein the brake pedal is pivotally attached to an upper surface of the rearward portion.

3. The steerable snow scooter as claimed in claim 2 wherein the brake pedal is attached to the upper surface of the rearward portion with at least one spring that is attached to an attachment plate, the spring being configured to bias the brake plate upwardly away from the snow when the mechanical brake member is unused.

4. The steerable snow scooter as claimed in claim 3 wherein the mechanical brake is employed by exerting pressure on the brake pedal.

5. The steerable snow scooter as claimed in claim 1, further comprising a skag positioned near the rear end of the rearward portion for stabilizing the snow scooter during travel on snow.

6. The steerable snow scooter as claimed in claim 5 wherein the skag is removable.

7. The steerable snow scooter as claimed in claim 5 wherein the skag is integral with the brake member.

8. The steerable snow scooter as claimed in claim 1 further comprising a tread positioned below the bottom of the rearward portion for facilitating movement of the snow scooter during travel on snow.

9. The steerable snow scooter as claimed in claim 1 further comprising at least one wheeled component for facilitating movement of the snow scooter during travel on snow.

10. The steerable snow scooter as claimed in claim 9 wherein the at least one wheeled component is a motorize wheeled component.

11. The steerable snow scooter as claimed in claim 10 wherein the at least one motorized wheeled component is powered by at least one battery.

12. The steerable snow scooter as claimed in claim 9, wherein the at least one wheeled component is retractable.

13. The steerable snow scooter as claimed in claim 1, wherein the bottom surface of the rearward portion is grooved.

14. The steerable snow scooter as claimed in claim 1, wherein the top surface of the rearward portion comprises an increased traction surface.

15. The steerable snow scooter as claimed in claim 1 wherein the hand-operable direction controlled comprises collapsible handle bars.

16. The steerable snow scooter as claimed in claim 15 wherein the collapsible handle bars comprise a secure latching mechanism to prevent inadvertent collapsing of the collapsible handle bars.

* * * * *